United States Patent

Garfinkle

[11] Patent Number: 6,141,408
[45] Date of Patent: Oct. 31, 2000

[54] TELEPHONE ADDRESSING SYSTEM

[76] Inventor: Moishe Garfinkle, P.O. Box 15855, Philadelphia, Pa. 19103

[21] Appl. No.: 08/837,055

[22] Filed: Apr. 11, 1997

[51] Int. Cl.[7] .............................. H04M 3/00; H04M 3/42; H04M 7/00
[52] U.S. Cl. .......................... 379/201; 379/207; 379/210; 379/229; 379/258
[58] Field of Search .............................. 379/211, 100.01, 379/201, 207, 210, 229, 258

[56] References Cited

U.S. PATENT DOCUMENTS 5,018,191 5/1991 Catron et al. ...................... 379/100.09
5,465,295 11/1995 Furman ................................ 379/211

Primary Examiner—Harry S. Hong
Attorney, Agent, or Firm—Stuart E. Beck

[57] ABSTRACT

An alpha-numeric character telecommunications address assignment system which distinguishes between first and second telecommunication addresses which are identified by the same alpha-numeric characters appearing in the same order by including a symbol having a distinctive symbol dialtone intermediate the ends of one of said addressees where the symbol dialtone is not used in an alpha-numeric telecommunications address assignment system so that either the first or second addresses can be selectively accessed by the selective use of the symbol dialtone.

23 Claims, 2 Drawing Sheets

TELEPHONE ADDRESSING SYSTEM

FIELD OF THE INVENTION

This invention relates to the field of telephony and more particularly to the a system that increases the number of telephone addresses in an alpha-numeric telephone address system.

BACKGROUND OF THE INVENTION

The number of telephone addresses available to subscribers in the United States is limited to the combination of allowable digits in the address array. For larger cities the earliest combination was simply four numbers n $$nnnn \qquad (1)$$

for each telephone address, allowing almost 10,000 addresses, which served well enough for a limited market with a single exchange. With telephones proliferating however additional exchanges were required, particularly with the advent of automatic dialing. With the interconnection of exchanges not only within the service area of a particular telephone company but between telephone companies it was soon obvious to telecommunication engineers that a telephone address convention would have to be adopted incorporating uniform exchange identifiers into telephone addresses.

According to the convention agreed upon, exchanges would be labeled by names using a three letter alphabetical identifier. Alphabetical letters would accompany each number on the dial as Alphabetical letters would accompany each number on the dial as shown in FIG. 1A. The exchange names would comprise three letters eee that would serve as a mnemonic: by separating the telephone address into the two groups of alphanumeric characters subscribers could more easily remember their telephone addresses. The exchange identifier would precede the four-digit telephone address. This expanded seven-digit sequence is generally represented by two bound arrays of characters with a divider:

$$eee\text{-}nnnn \qquad (2)$$

The number of available telephone addresses increased, but not too significantly because each three-letter group still had the same numerical counterpart. To further increase the numbers of available addresses when expansion became necessary the final letter of each exchange identifier was subsequently changed to a number, increasing the available telephone addresses nine-fold for each exchange.

$$een\text{-}nnnn \qquad (3)$$

Automatic dialing was accomplished by actuating an electromechanical rotary switch in each telephone which sent a sequential number of audible pulses equal to each number-digit dialed to a ganged series of rotary switches actuated by stepping motors located at the local exchange.

The next step was direct long-distance dialing. The country was sectioned into discrete regions, each with a three digit area code ccc. Although dialing within any region did not require the area code, the complete telephone address for each subscribed now took the sequential form $$(ccc)\ een\text{-}nnnn \qquad (4)$$

Fortunately the 1 and 0 numerals were not accompanied by letters and therefore no exchanges began with these dial positions. Local addresses do not begin with a 0 or a 1. Accordingly these digits were available to be used as an access code a. If the first digit dialed was either a 1 or an 0 this signaled the exchange that ten digits would follow, rather than the expected seven digits for a local call.

$$a\ (ccc)\ een\text{-}nnnn \qquad (5)$$

Telecommunications engineers had recognized that electromechanical switching was far too slow to accommodate the ever-increasing number of telephones in service, and moreover rotary switches were too prone to mechanical failure. Electronic switching was the logical next step. This was accomplished by assigning an audible dialtone to each dial number, with each telephone equipped with a dialtone generator. Consequently the dial itself could be replaced with key switches, as shown by the keypad in FIG. 1B.

Because stray tones on the telephone lines could trigger random dialing errors, two dialtone frequencies transmitted simultaneously: denoted multifrequencies, were specified for each switch arranged in a simple 4×4 matrix. A 4×4 matrix would require eight discrete frequencies, and the frequencies adopted, shown in hertz units in FIG. 1B, were well separated to eliminate misrecognition errors. The idea of discrete exchanges was dropped and each three-digit exchange address became simply one of almost 1000 numerical combinations.

This matrix arrangement accommodates 16 audible multifrequency combinations. This new arrangement allows an additional six switches to be added to telephone keypads when future demands required. These were designated the *, #, A, B, C and D keys. These additional keys will be referred to as symbol keys to distinguish them from the ten customary keys. Designating four of these symbol keys by letters however was a very poor choice indeed considering that these letters already appeared on the customary keys.

Although the letters Q and Z are still available other possible symbols such as @, &, % and $ have specific means that would again lead to perplexity. The expected confusion mitigated against adopting symbol keys in telephone addresses. As is often the case in progressive developments old conventions can hobble new adaptations. Only the * and # keys now appear on telephone keypads.

The only consequential advantage of electronic switching over electromechanical switching beyond speed is the availability of the multifrequencies to control automated devices attached to telephone lines, leaving the problem of the diminishing availability of addresses unsolved. With the proliferation of facsimile machines this problem has become acute. In virtually all commercial establishments an additional facsimile line with its own telephone address is now required in normal business practice, but the number of addresses available is still restricted by the sequence shown in Expression (3) for local usage and Expression (5) for long-distance usage.

The simplest solution to this problem would be to subdivide the country into regions each with one of the almost 800 area code combinations allowable, which appears to be the direction the telephone companies are taking. This will however be quite confusing as far as distinguishing between local and long distance calls is concerned, and resented by subscribers because ten digits will be required for most calls. Of course the area codes can be eliminated altogether and each subscriber gets immediately a ten-digit telephone address instead of progressively using the first scheme. By eliminating the need for access codes moreover this would increase the available addresses by almost 1000. Again there would be strong public resentment against the ten digits required for all calls.

Another approach would be to lift the restrictions posed by Expressions (3) and (5) and simply add additional digits to telephone addresses as required. However this approach would require additional access codes to signal the number of digits to follow. Moreover the combinations shown in Expressions (3) and (5) are mnemonics, aiding in the memorization of a telephone address by establishing a fixed grouping arrangement of digits. Ultimately this latter approach would lead to an increase in misdialing as the number of digits required to reach any party will change with the address. It is as impractical as using the A, B, C and D symbol keys in telephone addresses.

SUMMARY OF THE INVENTION

In general the invention relates to an alpha-numeric character telephone address assignment system that distinguishes between first and second telephone lines that are identified by the same telephone addresses which addresses are distinguished by the inclusion of a symbol having a distinctive symbol dialtone that is not used in an alpha-numeric telephone address assignment system in one of said telephone addresses so that for a particular alpha-numeric telephone address one of the telephone lines can be selectively accessed by the selective use of said symbol dialtone.

In an other aspect the invention relates to a bound array alpha-numeric character telephone address assignment system that distinguishes between first and second telephone lines that are identified by the same telephone addresses which addresses are distinguished by the inclusion of a symbol dialtone having a distinctive dialtone that is not used in an alpha-numeric telephone address assignment system in one of said telephone addresses so that for a particular alpha-numeric telephone address either said first or second lines can be selectively accessed by the selective use of said symbol dialtone.

In a still further aspect the invention relates to a method of distinguishing between first and second telephone lines that are identified by the same telephone addresses which addresses are distinguished by the including in one of said telephone addresses a symbol dialtone having a distinctive dialtone that is not used in an alpha-numeric telephone address assignment system, and selectively accessing one of said telephone lines by selectively using said symbol dialtone.

In a still further aspect the invention relates to a method of distinguishing between first and second telephone lines in a bound array, alpha-numeric telephone address assignment system that are identified by the same telephone addresses which addressess are distinguished by including in one of said telephone addresses a symbol dialtone having a distinctive dialtone that is not used in an alpha-numeric telephone address assignment system, and selectively accessing one of said telephone lines by selectively using said symbol dialtone.

OBJECT OF THE INVENTION

An object of the invention is to increase the number of telephone addresses available without perceivably disturbing the fixed digit groupings now acceptable throughout the United States for local and long-distance calls.

DESCRIPTION OF THE DRAWING

The invention can be further understood by referring to the accompanying drawing of a presently preferred form thereof, wherein.

DESCRIPTION OF A PREFERRED EMBODIMENT OF THE INVENTION

Consider now the invention disclosed herein which teaches an increase in the number of digits in the customary telephone address arrangement in a manner virtually indistinguishable to the telephone users from the combinations shown in Expressions (3) and (5). The additional digit essentially is imperceivable to the telephone user. The ultimate usefulness of this invention however requires that it is utilized in the particular manner as disclosed rather than indiscriminately.

The keys designated * and # with the multifrequencies 941/1209 hertz and 941/1663 hertz are not used at present in telephone addressing. To simply add these keys to new telephone addresses would lead to the same confusion as would adding additional digits, and would add significant mnemonic difficulties, leading to increased misdialing. According to the disclosed invention these two multifrequencies 941/1209 hertz and 941/1663 hertz serve rather as place-setters in telephone addresses to specify the type of telecommunication equipment to be accessed.

The invention disclosed herein teaches an increase in the number of digits in the telephone address arrangement in a manner virtually indistinguishable to the telephone users from these combinations to which they are presently accustomed. The additional digit essentially is imperceivable to the telephone user. The ultimate usefulness of this invention however requires that it is utilized preferably in a particular manner as disclosed herein rather than indiscriminately.

The keys designated * and # with the multifrequencies 941/1209 hertz and 941/1663 hertz are not used at present in telephone addressing although they are used by automated devices controlled by multifrequency tones, and to simply add these keys to new telephone addresses would lead to the same confusion as would adding additional digits, and would add significant mnemonic difficulties, leading to increased misdialing. According to the disclosed invention these two multifrequencies 941/1209 hertz and 941/1663 hertz serve rather as markers or place-setters specifying the type of telecommunication equipment to be accessed.

Figures 1A, 1B:
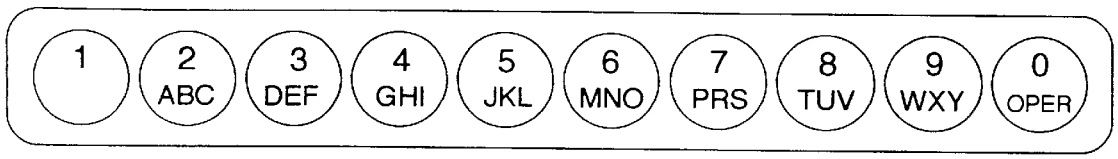
FIG. 1A is a dialing digit arrangement for electro-mechanical switching.
FIG. 1B is a keypad digit arrangement for electronic switching.
Figure 2A:
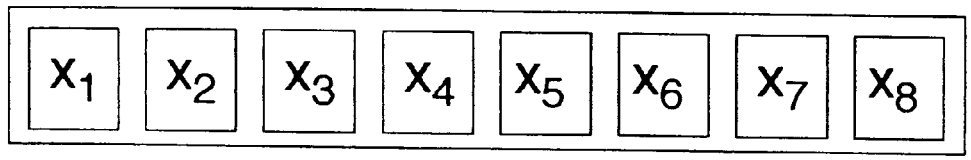
FIG. 2A is an eight-place array.

To remember a string of eight random numbers can be difficult, and to recall them without random errors at any occasion at which it might be necessary can be more difficult. Such a random array is shown in FIG. 2A. To alleviate this problem the characters are grouped in a fixed arrangement, shown in FIG. 2B as two bound groups of digit character separated by a divider character.

Although we do not consciously refer to the divider it remains as part of the array we remember, and when we recall a telephone address we recall as well the divider, and momentarily pause at the divider when reciting or typing the address. Essentially, we do not recall the characters as a single array but as two bound groups.

According to the disclosed invention a marker will be added to the array for multifunctional purposes. This marker might be either * or #. For example, if * appears in the address then the caller will be accessing a facsimile machine.

Figure 2B:
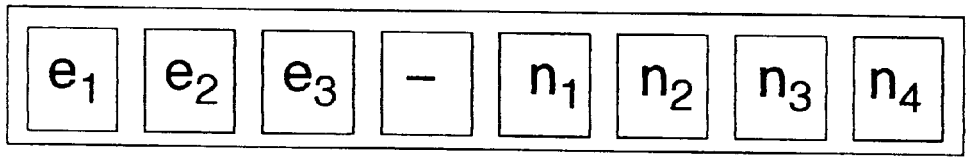
FIG. 2B is an eight-character array of two bound group with divider.
Figure 3:
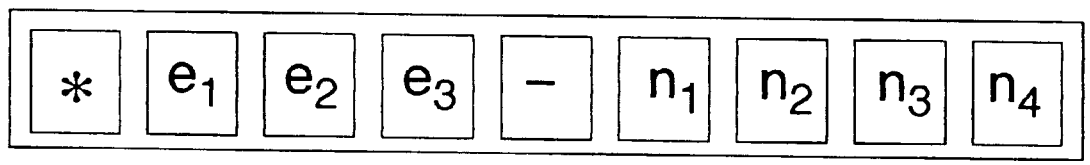
FIG. 3 is a nine-character array of two bound groups with divider.

However, the position of this marker in the array will be as important as the marker itself. Consider the case of the marker preceding the address as shown in FIG. 3. FIG. 2B shows an audible line and FIG. 3 a facsimile line, both for the same subscriber and both with the same numerical digits. For the audible line the address comprises an eight-digit array and for the facsimile machine the address comprises a nine-digit array: an extra array position is now required. Hence the expected eight-digit array convention shown in FIG. 2B is broken and its mnemonic advantage lost.

Figure 4A:
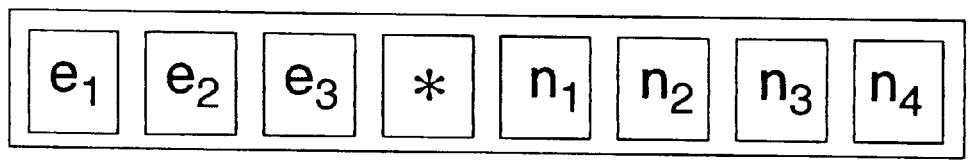
FIG. 4A is an eight-character array of two bound groups with symbol divider.

An alternative arrangement is shown in FIG. 4A. Not only is the expected seven-digit array of FIG. 2B preserved as two bound arrays with a divider, but the * fits comfortably as a marker or place-setter at the divider between the bound arrays. Hence the divider is preserved as a mnemonic but has an additional access function.

For example consider a telephone subscriber with two lines, an ordinary audible line and a facsimile line. These addresses are represented by two bound arrays of digits with a divider as $$e_1e_2e_3\text{-}n_1n_2n_3n_4 \tag{6a}$$

and $$e_4e_5e_6\text{-}n_5n_6n_7n_8. \tag{6b}$$

According to the present invention subscribers would have the option of changing their telephone addresses to $$e_1e_2e_3\text{-}n_1n_2n_3n_4 \tag{7a}$$

and $$e_1e_2e_3*n_1n_2n_3n_4. \tag{7b}$$

There is now an extra digit in the (7b) sequence, but it is essentially imperceivable to the telephone user as it requires neither another character to be recalled nor alters the conventional grouping of digits shown in Expression (3). Both telephone addresses are still represented by two bound arrays of digits with a divider in accordance with Expression (3). The symbol * is placed at the divider where telephone addresses are mnemonically separated into two bound groups of digits. Hence the symbol * serves solely as a place setter and indicates simply that a facsimile machine is being accessed.

Although the access tones for long distance calls are recognized by the switching program to normally indicate that ten digits are to follow, a * tone embedded within the sequence following the first six digits would superseded this command, indicating that four subsequent digits will follow. As in conventional practice the subscriber's facsimile machine would be accessible by both the old and new addresses for some adjustment period after the conversion.

Only the address $e_1e_2e_3*n_1n_2n_3n_4$ need appear on telephone directory listings and company letterheads inasmuch as the symbol * would indicate that a telephone is also accessible at the same numerical address, greatly simplifying commercial telecommunication access, an advantage that would be readily perceived by marketers, promoters and advertisers. Although the number of keys to be actuated is increased, the perceived number of keys required to specify a telephone address is not altered.

Similarly for residential users of telecommunications devices such as facsimile machines; the symbol * in the home telephone address would indicate that a facsimile machine is accessible. Private subscribers who do not wish general access to their facsimile machines would simply specify that the symbol * be omitted from their telephone directory listing.

Most significantly however, the address released for reuse: $e_4e_5e_6\text{-}n_5n_6n_7n_8$, can itself accommodate two telephone lines:

$$e_4e_5e_6\text{-}n_5n_6n_7n_8 \tag{8a}$$

and $$e_4e_5e_6*n_5n_6n_7n_8. \tag{8b}$$

Hence the impact of telecommunications devices such as facsimile machines on the number of available telephone addresses can be largely ameliorated. However, the advantages of the disclosed invention would be even more significant for future telecommunication services.

Telecommunications devices such as modems are gaining the same status as facsimile machines as necessary business tools, and could be accessed in accordance with the present invention by the address $$e_4e_5e_6\#n_5n_6n_7n_8. \tag{9}$$

As before, accessing a telecommunications devices such as a modem will not require additional telephone addresses. Expression (9) appearing on telephone directory listings and company letterheads will imply that $e_4e_5e_6\text{-}n_5n_6n_7n_8$ and $e_4e_5e_6*n_5n_6n_7n_8$ are also accessible at this address. The result will be to greatly simplify telecommunication access in the United States without perceivably affecting the conventional telephone addressing arrangement.

Figure 4B:
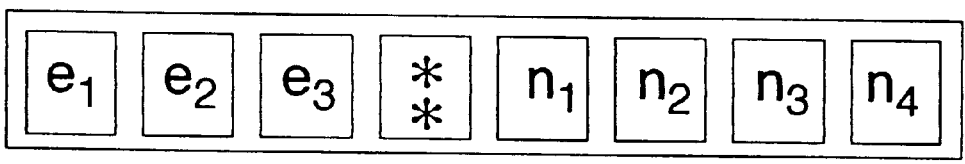
FIG. 4B is an eight-character array of two bound groups with double-symbol divider.

If the number of special telecommunications devices or lines to be accessed further increases, as should be expected, then additional symbol key sequences can be incorporated at the group divider for highly specialized purposes, such as the series: **, *#, #* or ##, as shown in FIG. 4B. Mnemonically there are still two bound groups of digits and a divider. Cellular telephones might use ** while pagers might use ##.

Although the access tones for long distance calls are recognized by the switching program to normally indicate that ten digits are to follow, a combination of * or # tones or both embedded together within the sequence following the first six digits would superseded this command, indicating that four subsequent digits will follow the final symbol key tone. Again, although the number of keys to be actuated is further increased, the perceived number of keys required to specify a telephone address is not altered.

While there have been described what is at present considered to be the preferred embodiments of the invention, it will be obvious to those skilled in the art that various changes and modifications may be made therein without departing from the invention, and it is the objective therefore in the appended claims to cover all such changes and modifications as fall within the true spirit and scope of the invention.

I claim:

1. An alpha-numeric character telecommunications address assignment system which distinguishes between first and second telecommunication addresses where each character corresponds to a distinctive dialtone, including both of said addresses being identified by the same alpha-numeric characters appearing in the same order, including intermediate the ends of one of said addressees a symbol having a distinctive symbol dialtone, and said symbol dialtone not being used in an alpha-numeric telecommunications address assignment system so that either said first or second addresses can be selectively accessed by the selective use of said symbol dialtone.

2. An alpha-numeric system as defined in claim 1, wherein said addresses comprise at least two bound groups of alpha-numeric characters, and said symbol dialtone is located intermediate said bound groups for one of said addresses.

3. An alpha-numeric system as described in claim 1 wherein said symbol dialtone includes an *.

4. An alpha-numeric system as described in claim 1 wherein said symbol dialtone includes an #.

5. An alpha-numeric system as described in claim 1 wherein said symbol dialtone is selected from the group consisting of *, **, #, ##, *# and #*.

6. An alpha-numeric system as described in claim 1 wherein said symbol dialtone is selected from the group consisting of ***, ###, *##, #, #, ##*, *#* and #*#*.

7. A telecommunication address assignment system where the addresses comprise arrays of bound groups of alpha-numeric characters which address assignment system distinguishes between a first and a second addresses and where each character corresponds to a distinctive dialtone, including at least two telecommunications addresses identified by the same alpha-numeric characters appearing in the same order, a symbol dialtone having a distinctive dialtone intermediate the ends of one of said alpha-numerical addresses, and said symbol dialtone not being used in an alpha-numeric address assignment system, so that either said first or second addresses can be selectively accessed by the selective use of said symbol dialtone.

8. A telecommunications address assignment system as described in claim 7 wherein said symbol dialtone includes an *.

9. A telecommunications address assignment system as described in claim 7 wherein said symbol dialtone includes an #.

10. A telecommunications address assignment system as described in claim 7 wherein said symbol dialtone is selected from the group consisting of *, **, #, ##, *# and #*.

11. A telecommunications address assignment system as described in claim 7 wherein said symbol dialtone is selected from the group consisting of ***, ###, *##, #, #, ##*, *#* and #*#.

12. A method of distinguishing between a first and second telecommunications addresses in a system where both of said addresses are identified by the same alpha-numeric characters appearing in the same order and where each character corresponds to a distinctive dialtone, including the steps of including intermediate the ends of the alpha-numeric address in one of said addresses a symbol dialtone having a distinctive dialtone that is not used in an alpha-numeric telephone address assignment system, and selectively accessing one of said addresses by selectively using said symbol dialtone.

13. A method as defined in claim 12 wherein said telephone addresses comprise at least two bound groups of alpha-numeric characters, and including the step of accessing said symbol dialtone intermediate said bound group.

14. A method as defined in claim 12 including the step of selecting said symbol dialtone to include an *.

15. A method as defined in claim 12 including the step of selecting said symbol dialtone to include an #.

16. A method as defined in claim 12 including the step of selecting said symbol dialtone from the group consisting of *, **, #, ##, *# and #*.

17. A method as described in claim 12 including the step of selecting said symbol dialtone from the group consisting of ***, ###, *##, #, #, ##*, *#* and #*#.

18. A method of distinguishing between first and second telecommunications addresses where both of said addresses comprise the same arrays of bound groups of alpha-numeric characters appearing in the same order and wherein each character corresponds to a distinctive dialtone, including the steps of including intermediate the ends of one of said addresses a symbol dialtone having a distinctive dialtone that is not used in an alpha-numeric telephone address assignment system, and selectively accessing one of said addresses by selectively using said symbol dialtone.

19. A method as defined in claim 18 wherein said addresses comprise at least two bound groups of alpha-numeric characters, and including the step of accessing said symbol dialtone intermediate said bound groups.

20. A method as defined in claim 18 including the step of selecting said symbol dialtone to include an *.

21. A method as defined in claim 18 including the step of selecting said symbol dialtone to include an #.

22. A method as defined in claim 18 including the step of selecting said symbol dialtone from the group consisting of *, **, #, ##, *# and #*.

23. A method as defined in claim 18 wherein said symbol dialtone is selected from the group consisting of ***, ###, *##, #, #, ##*, *#* and #*#.

* * * * *